US 7,970,885 B2

(12) United States Patent
Kim

(10) Patent No.: US 7,970,885 B2
(45) Date of Patent: *Jun. 28, 2011

(54) METHOD FOR INTERACTING WITH USER AND TERMINAL THEREOF

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,744

(22) Filed: Apr. 30, 2010

(65) Prior Publication Data

US 2010/0223371 A1 Sep. 2, 2010

Related U.S. Application Data

(63) Continuation of application No. 11/655,842, filed on Jan. 22, 2007, now Pat. No. 7,739,368.

(60) Provisional application No. 60/760,943, filed on Jan. 23, 2006, provisional application No. 60/762,517, filed on Jan. 27, 2006.

(51) Int. Cl.
*G06F 15/173* (2006.01)
*G06F 15/16* (2006.01)

(52) U.S. Cl. ........................................ 709/223; 709/202

(58) Field of Classification Search .................. 709/223
See application file for complete search history.

(56) References Cited

U.S. PATENT DOCUMENTS

| 2003/0204640 A1 | 10/2003 | Sahinoja et al. |
| 2004/0043788 A1 | 3/2004 | Mittal |
| 2004/0056878 A1 | 3/2004 | Lau et al. |
| 2004/0172469 A1 | 9/2004 | Takahashi et al. |
| 2006/0013566 A1 | 1/2006 | Nakamura |
| 2006/0094400 A1 | 5/2006 | Beachem et al. |
| 2006/0117073 A1 | 6/2006 | Bosworth et al. |
| 2006/0143179 A1 | 6/2006 | Draluk et al. |
| 2007/0027971 A1 | 2/2007 | Marolia et al. |
| 2007/0093243 A1 | 4/2007 | Kapadekar et al. |

FOREIGN PATENT DOCUMENTS

| JP | 11-39165 | 2/1999 |
| JP | 2003-196412 | 7/2003 |
| JP | 2005-65281 | 3/2005 |
| WO | WO 2006/006803 | 1/2006 |

*Primary Examiner* — Hassan Phillips
*Assistant Examiner* — Taylor Elfervig
(74) *Attorney, Agent, or Firm* — Birch, Stewart, Kolasch & Birch, LLP

(57) ABSTRACT

The present specification related to a method for interacting with a user and terminal thereof. The present specification provides a terminal comprising a first module adapted to receive a scheduling context including scheduled device management from a server and to install the received scheduling context, and a second module adapted to provide one or more of notification to a user about the scheduled device management, and an option allowing the user to modify the scheduled device management before performing the scheduled device management.

13 Claims, 4 Drawing Sheets

METHOD FOR INTERACTING WITH USER AND TERMINAL THEREOF

RELATED APPLICATION

This application is a Continuation of application Ser. No. 11/655,842, filed in the U.S. on Jan. 22, 2007 now U.S. Pat. No. 7,739,368, which claims priority to U.S. Provisional Application No. 60/760,943, filed in the U.S. on Jan. 23, 2006 and U.S. Provisional Application No. 60/762,517, filed in the U.S. on Jan. 27, 2006. The entire contents of all of the above applications are hereby incorporated by reference.

BACKGROUND OF THE INVENTION

1. Field of the Invention

The present specification relates to a method for interacting with a user and terminal thereof.

2. Description of the Related Art

In general, a DM technique is a technique that resources of a client (terminal) are shown in the form of a DM object existing on a DM tree to a DM server so that the DM server can access it, thereby allowing the DM server to easily manage the terminal.

In the DM technique, the DM server may instruct a DM target client to process a command for a DM. The DM target client can immediately perform the corresponding command and report the performing result to the DM server. In addition, the DM server can request the DM client to change, update or delete a particular function.

However, the related art DM technique has shortcomings that a user cannot recognize the performing of the DM.

SUMMARY OF THE INVENTION

One exemplary feature of the present invention is to provide a device management (DM) system capable of allowing a user to interact with performing of a DM and a method for interacting with a user in the system.

To implement at least the above feature in whole or in parts, the present invention provides a terminal comprising a first module adapted to receive a scheduling context including scheduled device management from a server and to install the received scheduling context; and a second module adapted to provide one or more of notification to a user about the scheduled device management, and an option allowing the user to modify the scheduled device management before performing the scheduled device management.

The modification may be at least one of deferring, rescheduling, and canceling the scheduled device management. The first module can achieve the installation by generating the user interaction node in a DM tree of a terminal according to the user interaction information of the scheduling context. In this case, the user interaction node can include one or more of a first node specifying whether to provide to a user a message about performing of the device management; and a second node specifying whether to allow a user to modify the device management.

To implement at least the above feature in whole or in parts, the present invention also provides a server comprising a device management (DM) scheduling enabler for generating a scheduling context including scheduled device management and user interaction information, and requesting installation of the generated scheduling context in a terminal, wherein the user interaction information includes one of a first element specifying whether to provide to a user a message about performing of the device management, and a second element specifying whether to allow the user to modify the scheduled device management.

To implement at least the above feature in whole or in parts, the present invention also provides a method for performing a scheduled device management, the method comprises: detecting an arrival on schedule for performing a device management; providing at least one of a notification to a user, and an option allowing the user to change the schedule; performing the device management.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

A device management (DM) system and a method for interacting with a user in the system according to the exemplary embodiment of the present invention will now be described with reference to the accompanying drawings.

Figure 1:
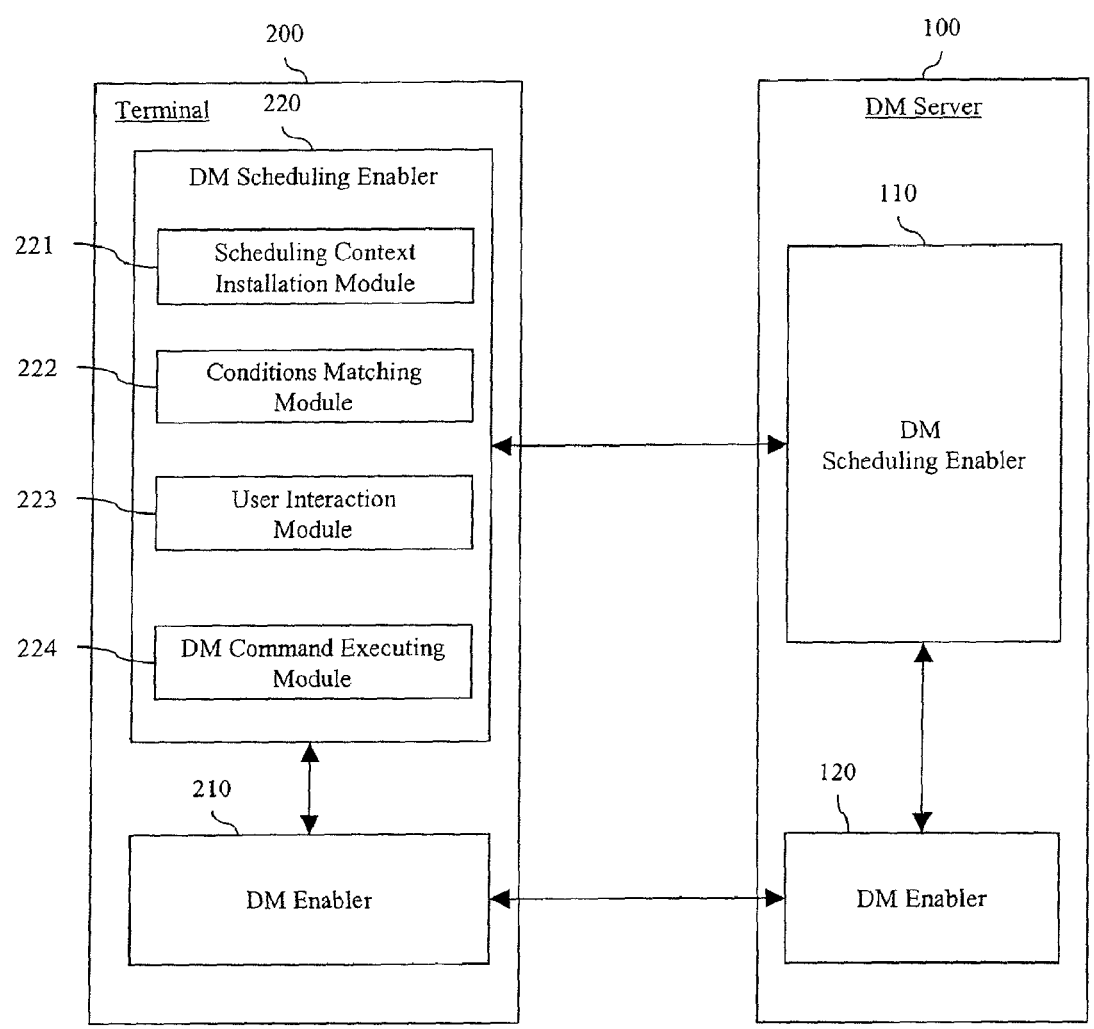
FIG. 1 is a view showing the structure of a device management (DM) system according to an exemplary embodiment of the present invention.
Figure 2:
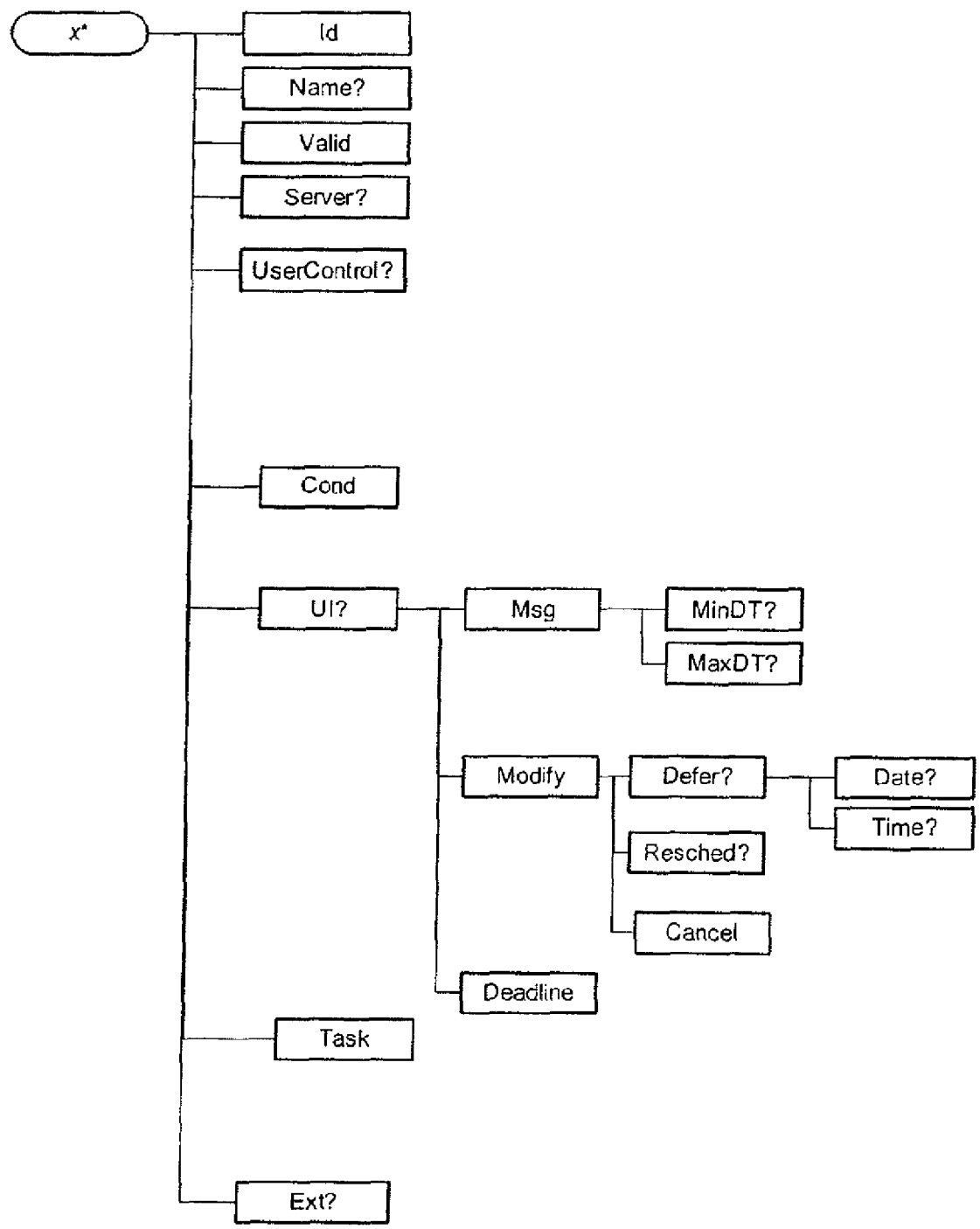
FIG. 2 is a view showing a scheduling context in the form of a DM tree.

FIG. 1 is a view showing the structure of a device management (DM) system according to an exemplary embodiment of the present invention, and FIG. 2 is a view showing a scheduling context in the form of a DM tree.

As shown in FIG. 1, the DM system according to the present invention includes a DM server 100 and a terminal 200.

DM Sever 100

The DM server 100 includes a DM scheduling enabler 110 and a DM enabler 120.

The DM scheduling enabler 110 can create a scheduling context and request the terminal 200 to install the created scheduling context so as to be performed therein.

In detail, the DM scheduling enabler 110 may create a scheduling context including general information and a schedule component. The general information may include an identifier of the scheduling context, the name of the scheduling context, a valid period of the scheduling context, and a server for owning the scheduling context, and a permission given to a user.

The schedule component may include scheduled device management and user interaction information. The scheduled device management may include a DM command and a condition for executing the DM command. The user interaction information may include one of a first element specifying whether to provide to a user a message about executing of the device management, and a second element specifying whether to allow the user to modify the scheduled device management. Here, the second element comprises one or more of a defer element specifying whether to allow a user to defer the device management, and a reschedule element specifying whether to allow the user to re-schedule the device management. In this case, the user interaction information may further include an element specifying whether to allow the user to confirm or cancel performing of the device management.

The DM scheduling enabler 110 may establish a session according to an OMA DM specification together with the terminal 200 and request the terminal 200 to install the generated scheduling context through the established session.

The DM enabler 120 performs a non-scheduled DM in cooperation with the DM enabler of the terminal.

Terminal 200

The terminal 200 may include a DM scheduling enabling unit 210 and a DM enabler 220.

The DM scheduling enabler 210 may include a scheduling context installation module 211, a conditions matching module 212 for checking whether a condition of executing a DM command is matched or not, a user interaction module 213, and a DM command executing module 214.

The scheduling context installation module 211 receives a request for installing a scheduling context from the DM server 100 and processes it. Namely, when the scheduling context installation module 211 receives the request from the server 100, it installs the scheduling context in the form of a DM tree within the terminal 200. In this case, the DM tree may include a general part and one or more schedule components.

The DM tree, the form of installation of the scheduling context, will be described as follows. The DM tree can have the structure as shown in FIG. 2.

In detail, as shown in FIG. 2, the general part includes an Id node indicating an identifier of the installed scheduling context, a Name node indicating a name of the scheduling context, a Valid node indicating a valid period of the scheduling context, a Server node indicating an owner of the scheduling context, and a User Control node specifying a permission given to a user.

The schedule component may include a Task node specifying a DM command (or, a message which includes at least one or more DM commands), a Condition node specifying a condition for executing the DM command, and a UI (User Interaction) node specifying a user interaction.

The UI node may include a Msg (Message) node specifying whether to provide to a user a message about executing of the scheduled device management, and a Modify node specifying whether to allow the user to modify the scheduled device management. The Msg node may include a Minimum duration time node specifying a minimum time that the message is to be provided to the user, and a maximum duration time node specifying a maximum time that the message is to be provided to the user. And, the Modify node comprises one or more of a Defer node specifying whether to allow the user to defer the scheduled device management, a Reschedule node specifying whether to allow the user to re-schedule the scheduled device management and a Cancel node specifying whether to allow the user to cancel the scheduled device management. The UI node may further include a Deadline node specifying a deadline deferred or re-scheduled by the user when deferring or rescheduling can be possible.

The scheduling context installation module 211 can interact with the user, before the scheduling context is installed. The interaction may include a provision of a notification about the installation of the scheduling context to the user. In addition, the interaction may include a provision of an option allowing the user to confirm or cancel the installation of the scheduling context. Also, the interaction may include a provision of an option allowing the user to view, change, suspend or terminate the scheduled device management.

The conditions matching module 212 monitors whether the condition is matched or not, and when the condition is matched, the conditions matching module 212 requests user interaction to the user interaction module 213 or requests the DM command executing module 214 to execute the DM command corresponding to the conditions.

The user interaction module 213 performs the user interaction when the conditions matching module 212 determines that the condition is matched.

The user interaction module 213 can provide a message to the user about the scheduled device management, i.e. the DM command and the condition.

Also, the user interaction module 213 can provide an option and receive a response corresponding to the option from the user. In detail, the user interaction module 213 may provide an option allowing the user to view and change the scheduled device management according to the Modify node. Namely, the user interaction module 213 may provide one or more of an option allowing the user to defer the scheduled device management according to the Defer node in the DM tree, and an option allowing the user to reschedule the scheduled device management, according to the Reschedule node of the DM tree (refer to Table 1 shown below).

Also, the user interaction module 213 may provide an option allowing the user to confirm or cancel executing of the scheduled device management.

In addition, the user interaction module 213 may provide an option allowing the user to stop or start operation of the scheduling context or suspend or resume the operation of the scheduling context as in table 2 shown below.

TABLE 1

| Type of user interaction | Description |
|---|---|
| Message | Providing a message about scheduling context or DM command |
| Defer | Deferring of scheduled DM command |
| Reschedule | Re-scheduling DM |

TABLE 2

| Type of user interaction | Description |
|---|---|
| Stop and start | Stopping or starting operation of scheduling context |
| Suspend and resume | Suspending or resuming operation of scheduling context |

As afore-mentioned, if the user changes the scheduled device management, the user interaction module 213 may allow the DM scheduling enabler 110 of the server 100 to recognize the change.

The DM command executing module 214 cooperates with the DM enabler 110 to perform the DM command, when the conditions matching module 212 determines that the condition is matched, and the user interaction is completed.

The DM enabler 220 performs the DM command in cooperation with the DM command executing module 214. In detail, the DM enabler 220 receives the DM command from the DM command executing module 214 and executes it, and then, returns a result to the DM command executing module 214.

In the construction of the DM system according to the present invention, the DM server 100 includes the DM scheduling enabler 110 and the DM enabler 120, and the terminal 200 includes the DM scheduling enabler 210 that includes the scheduling context installation module 211, the conditions matching module 212, the user interaction module 213 and the DM command executing module 214, and the DM enabler 220. However, the DM server 100 and the terminal 200 may include a processor (not shown), a network interface (not shown) and a storage unit (not shown).

Figure 3:
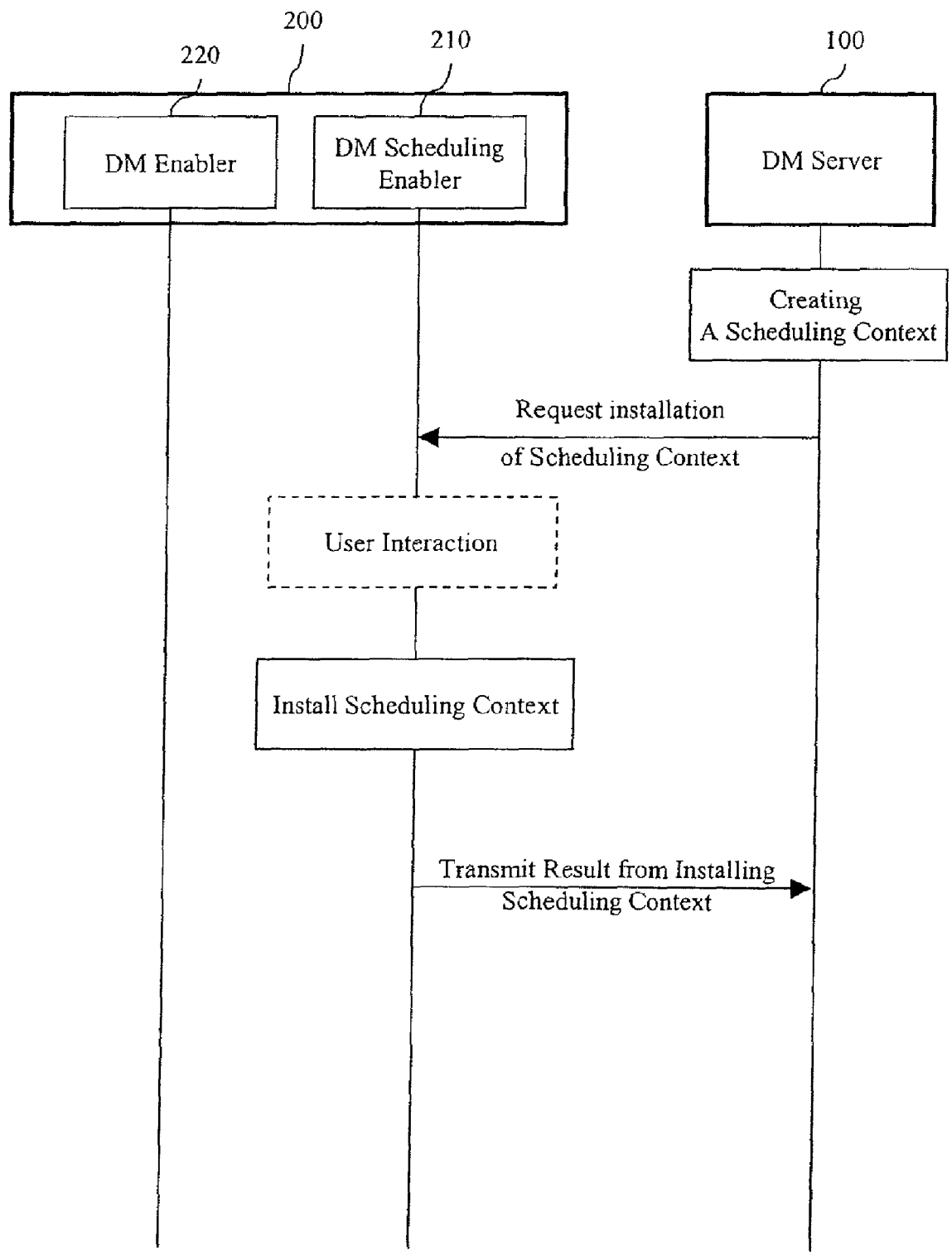
FIG. 3 is a flow chart showing a process of installing the scheduling context by a DM server in FIG. 1.
Figure 4:
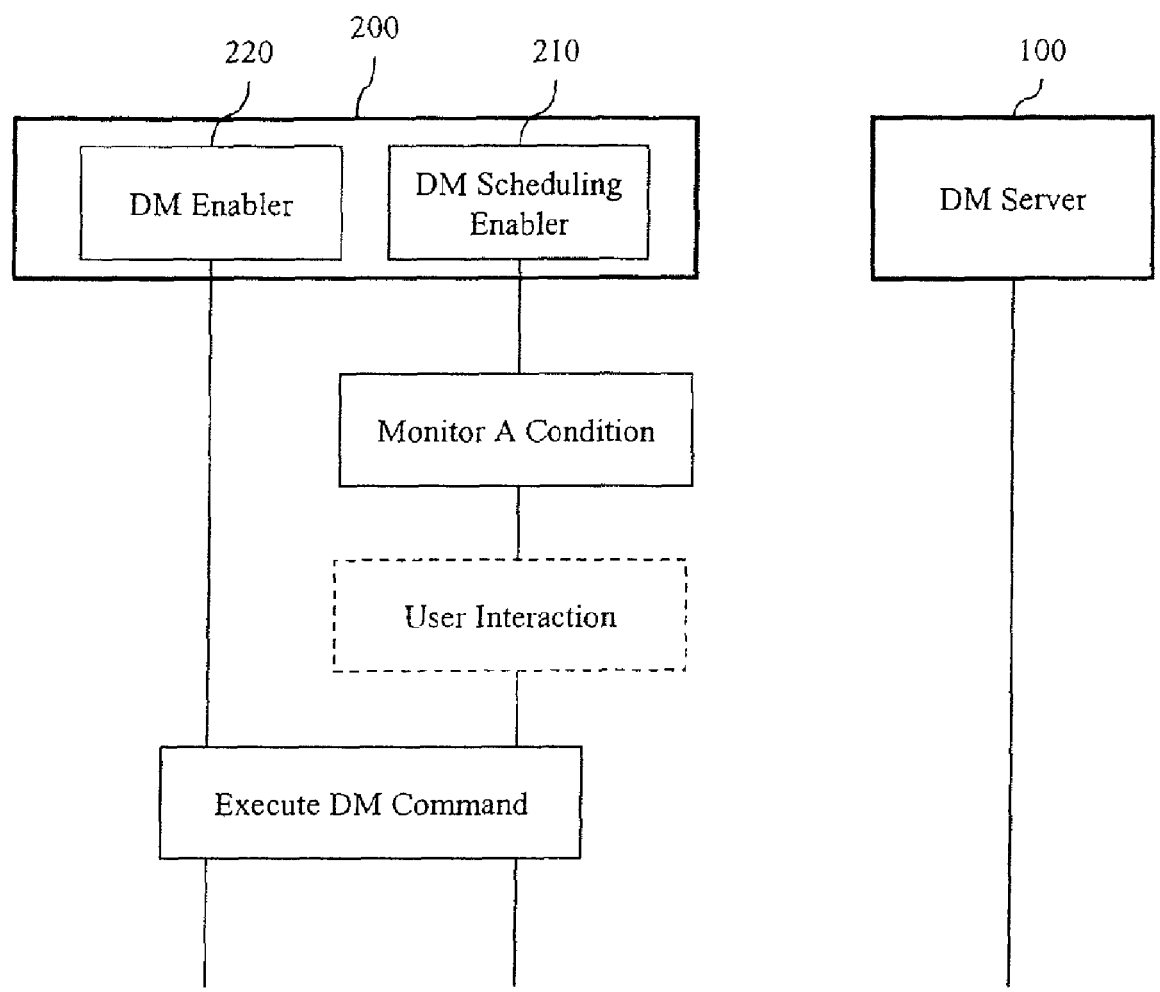
FIG. 4 is a flow chart showing a schedule componenting method.

The operation of the DM system constructed as described above will now be explained in detail with reference to FIGS. 3 and 4. In FIGS. 3 and 4, some elements are omitted for the sake of brevity, but the operation on the drawing is definitely performed by all the elements of the DM server 100 and the terminal 200.

FIG. 3 is a flow chart showing a process of installing the scheduling context by the DM server 100 in FIG. 1.

The installing process will be described as follows.

1) First, the DM server 100 (specifically, the DM scheduling enabler 110) creates the scheduling context including the general information and the schedule component. In this case, as mentioned above, the schedule component may include the DM command, the conditions for executing the DM command, and the user interaction information, etc.

2) Next, the DM server 100 connects a session to the DM scheduling enabler 210 of the terminal 200 and transfers an installation request of the generated scheduling context by using a DM protocol.

3) Then, the DM scheduling enabler 210 (specifically, the scheduling context installation, module 211) of the terminal 200 selectively makes the user confirm the installation of the scheduling context.

4) When the user interaction is completed, the DM scheduling enabler 210 (specifically, the scheduling context installation module 211) of the terminal 200 installs the scheduling context in the form of the DM tree within the terminal 200.

5) When the installing is completed, the DM scheduling enabler 210 of the terminal reports a result of installation of the scheduling context to the DM server 100.

FIG. 4 is a flow chart showing the DM scheduling method according to the exemplary embodiment of the present invention.

Each process will be described with reference to FIG. 4 as follows.

1) First, the DM scheduling enabler 210 (specifically, the conditions matching module 212) checks the Condition node of the DM tree to monitor whether a condition for executing a DM command is matched.

2) When the condition is checked to be matched according to the monitoring, the DM scheduling enabler 210 (specifically, the user interaction module 213) selectively performs user interaction. Herein, the user interaction can be performed according to the UI node of the DM tree as mentioned above.

In detail, the user interaction module 213 may provide to the user a message about information on the scheduling context or the information on the DM command according to the Notify node.

Also, the user interaction module 213 may provide one or more of an option allowing the user to modify the scheduled device management. In detail, the user interaction module 213 may allow the user to defer the schedule according to the Defer node, or allow the user to reschedule the schedule according to the Reschedule node.

In addition, the user interaction module 213 may provide an option allowing the user to stop or start the operation of the scheduling context or suspend or resume the operation of the scheduling context. Also, the user interaction module 213 may provide an option allowing the user to confirm or cancel executing of the DM command. Also, the user interaction module 213 may provide an option allowing the user to view or change the schedule.

3) When the user interaction is successfully performed, the DM scheduling enabler 210 (specifically, the DM command executing module 214) performs the DM command in cooperation with the DM enabler 220.

The method according to the present invention as described above can be implemented by software, hardware, or their combination. For example, the method according to the present invention can be implemented with codes or command languages in a software program that can be stored in a storage medium (e.g., an internal memory of a mobile terminal, a flash memory, a hard disk, or something else) and executed by a processor (e.g., an internal microprocessor of the mobile terminal).

As so far described, the DM system and a method for interacting with a user in the system according to the present invention have the following advantages.

That is, when the DM is performed, the user can interact therewith.

In addition, the user can arbitrarily change performing of the DM.

Also, the DM server can provide an improved DM by interacting with the user.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A device management (DM) method of a terminal, the method comprising:
    checking, at least one schedule which exists in a form of a device management tree in the terminal,
        wherein the schedule includes a task including a command for device management, a condition for execution of the task, and user interaction information,
        wherein the user interaction information includes at least one of a first element relating to a confirmation of the execution of the task, a second element specifying whether it is possible to reschedule the execution of the task, and a deadline element specifying a deadline until which it is possible to defer or reschedule the execution of the task, and
        wherein the schedule further includes control information for changing a state of the schedule, the state being toggled between a stopped state and a running state;
    providing, based on the control information, a first function capable of stopping or starting an operation of the schedule;
    after the state of the schedule is changed into the running state, waiting until the task has to be executed based on the condition for execution of the task;
    when the task has to be executed, providing based on at least one of the first element, the second element and the deadline element, a second function capable of confirming or rescheduling the execution of the task,
wherein the second function is provided to wait for a user action until a predetermined time, and
wherein the predetermined time includes a minimum time and a maximum time for which the user action is waited and a message is displayed; and
executing the task by the terminal without connecting with the server.

2. The method of claim 1, wherein
the running state indicates that an operation of the schedule is started; and
the stopped state indicates that the operation of the schedule is stopped.

3. The method of claim 1, wherein the second function is adapted to be capable of deferring or canceling the execution of the task.

4. The method of claim 1, wherein the user interaction information further comprises:
a defer element adapted to be capable of deferring the execution of the task.

5. The method of claim 1, further comprising:
providing, by the terminal, one or more notifications about the installation of the schedule; and
providing, by the terminal, a third function capable of canceling the installation of the schedule.

6. The method of claim 1, further comprising:
providing, by the terminal, a fourth function capable of viewing, changing, suspending or terminating the schedule.

7. The method of claim 1, wherein the first function is further adapted to be capable of stopping, starting, suspending or resuming the operation of the schedule.

8. A device management (DM) method of a terminal, the method comprising:
receiving, by the terminal, at least one schedule from a server;
installing, the received schedule in a form of a device management tree in the terminal,
wherein the schedule includes a task that contains a command for device management, a condition for execution of the task, and user interaction information,
wherein the user interaction information includes at least one of a first element relating to a confirmation of the execution of the task, a second element specifying whether it is possible to reschedule the execution of the task and a deadline element specifying a deadline until which it is possible to defer or reschedule the execution of the task,
wherein the schedule includes valid time information specifying a valid period and server information specifying an owner of the schedule,
wherein the installed schedule is valid if the valid time is not yet expired, and
wherein the schedule further includes control information for changing a state of the schedule, the state being toggled between a stopped state and a running state;
providing, based on the control information, a first function capable of stopping or starting an operation of the schedule;
after the state of the schedule is changed into the running state, waiting until the task has to be executed based on the condition, for execution of the task;
when the task has to be executed, providing, based on at least one of the first element, the second element and the deadline element, a second function capable of confirming or rescheduling the execution of the task,
wherein the second function is provided to wait for a user action until a predetermined time, and
wherein the predetermined time includes a minimum time and a maximum time for which the user action is waited and a message is displayed; and
executing the task by the terminal without connecting with the server.

9. The method of claim 8, wherein the first function is further adapted to be capable of deferring or canceling the execution of the task.

10. The method of claim 8, wherein the user interaction information further comprises:
a defer element adapted to be capable deferring the execution of the task.

11. The method of claim 8, further comprising:
providing, by the terminal, one or more notifications about the installation of the schedule; and
providing, by the terminal, a third function capable of canceling the installation of the schedule.

12. The method of claim 8, further comprising:
providing, by the terminal to the user, a fourth function capable of viewing, changing, suspending or terminating the schedule.

13. The method of claim 8, wherein the first function is further adapted to be capable of stopping, starting, suspending or resuming the operation of the schedule.

* * * * *